D. BRENNAN.
CHARGING LADLE.
APPLICATION FILED MAR. 11, 1914.

1,102,236.

Patented July 7, 1914.
2 SHEETS—SHEET 1.

WITNESSES:

INVENTOR
Daniel Brennan
by Christy and Christy
Atty

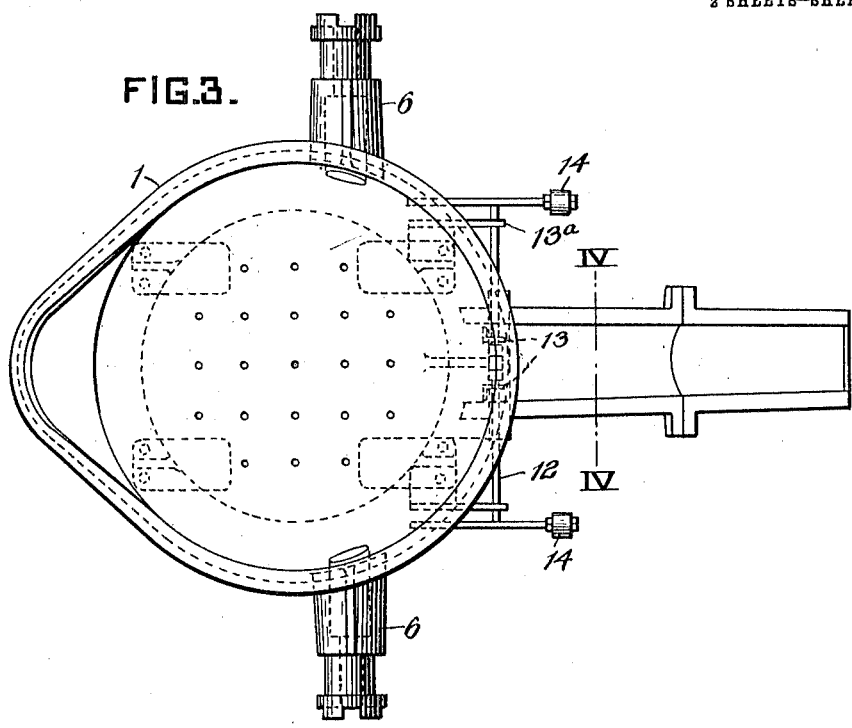
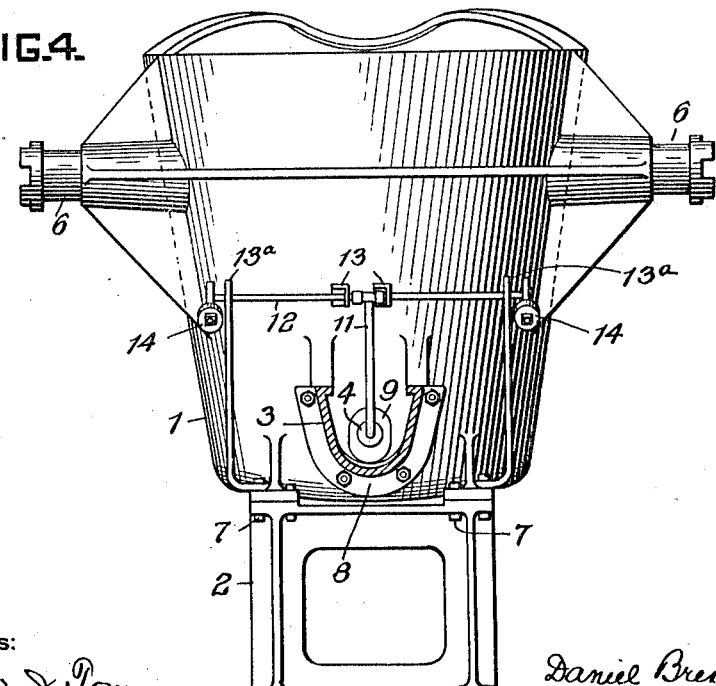

UNITED STATES PATENT OFFICE.

DANIEL BRENNAN, OF WOODLAWN, PENNSYLVANIA.

CHARGING-LADLE.

1,102,236.    Specification of Letters Patent.    Patented July 7, 1914.

Application filed March 11, 1914. Serial No. 823,867.

*To all whom it may concern:*

Be it known that I, DANIEL BRENNAN, residing at Woodlawn, in the county of Beaver and State of Pennsylvania, a citizen of the United States, have invented or discovered certain new and useful Improvements in Charging-Ladles, of which improvements the following is a specification.

The object of my invention is to provide for steel manufacturing plants a furnace charger for putting molten metal into furnaces, and particularly adapted to be used in Charging-Ladles, of which improvements the following is a specification.

In large open hearth plants a plurality of furnaces are usually placed side by side and are charged and drawn successively. In order to increase the production of steel from each furnace it has become the practice in several works to put a suitable quantity of molten metal reduced in a Bessemer converter into the open hearth furnace. A large amount of silicious or acid slag comes with the metal from the Bessemer converter. If this slag be allowed to enter the open hearth furnace, it must be neutralized by adding a suitable agent, such as lime. My invention is directed to overcoming the necessity of adding large quantities of lime for the purposes indicated. For charging the open hearth furnaces with bessemerized metal, I provide a charger which may be readily moved from one furnace to another and which is so constructed that the metal may be admitted through the furnace door by means of a spout attached to the charger, suitable means being provided to prevent the slag from entering the furnace.

The preferred form of the charger is illustrated in the accompanying sheets of drawings, which form part of my specification.

Figure 1:
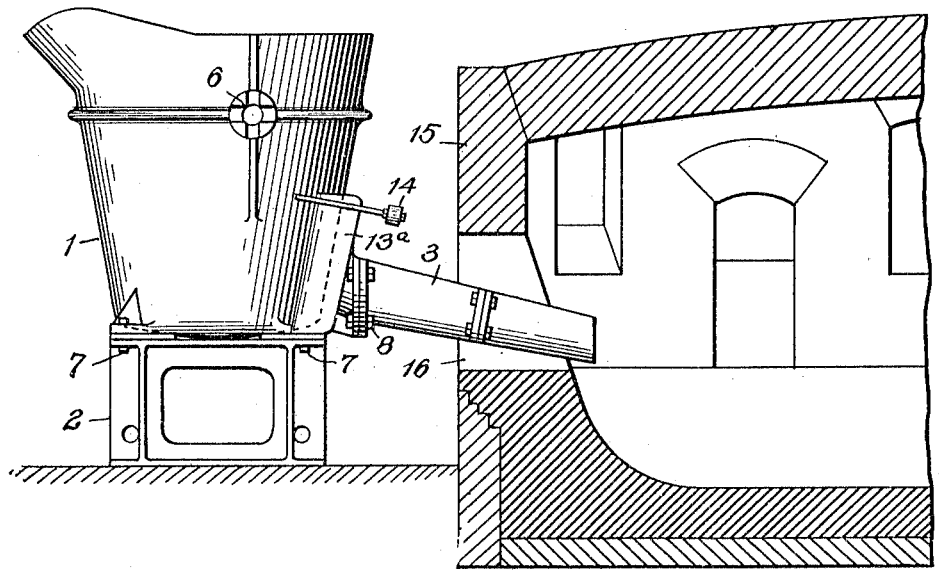
Figure 2:
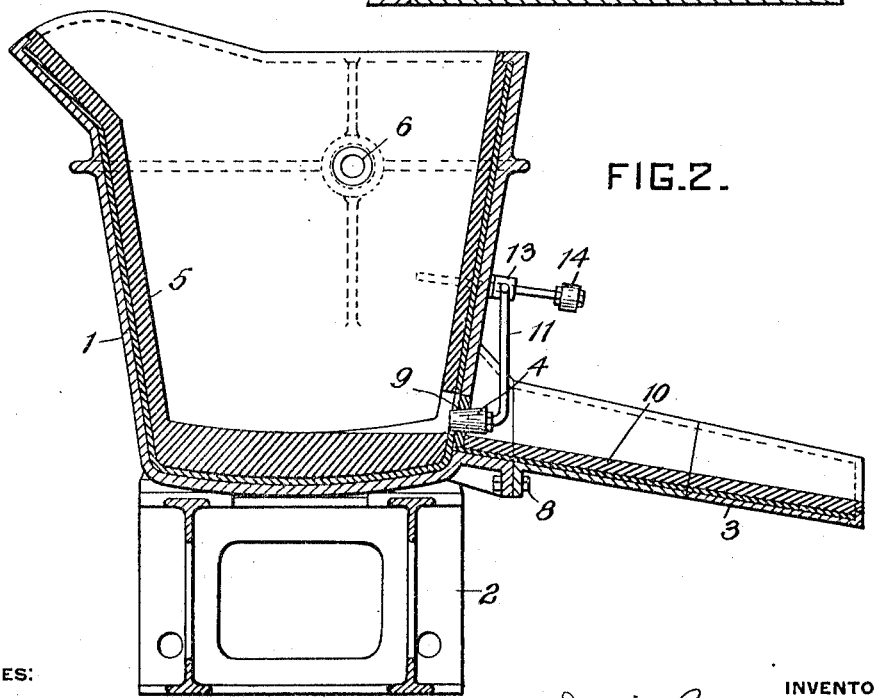

Figure 1 shows a side elevation of charger and a sectional view of a furnace into which it is adapted to charge molten metal; Fig. 2 a vertical sectional view of the charger shown in Fig. 1 but to enlarged scale; Fig. 3 a plan view of the charger; and Fig. 4 a sectional elevation taken on the line IV—IV, Fig. 3.

In the several views like numerals are used to designate like parts.

The charger comprises a ladle 1, a support or pedestal 2, spout 3 and stopper 4. The ladle may be of any desired form, and is provided with a refractory lining 5 and with trunnions 6, whereby the charger may be engaged by a crane and moved from one furnace to another. The pedestal 2, which is secured to the bottom of the ladle 1 by means of bolts 7, may be made of cast iron, and is of such height that, when the charger is resting on the floor in front of a furnace, the spout 3 will extend through the door thereof, as shown in Fig. 1. The spout 3 extends laterally from the ladle and is secured to the side thereof, as by bolts 8, there being an orifice 9 in the side wall of the ladle leading to the spout, the arrangement being such that the molten metal will flow gradually into and through the spout, rather than impinge in a stream on, and possibly destroy, the refractory lining 10 thereof. The stopper 4 is preferably operated and controlled by suitable means secured to the outside of the ladle and within easy reach of a workman. As shown herein, the stopper is attached to an arm 11, secured to a rod 12, pivotally mounted in suitable brackets 13 and 13ᵃ extending laterally from the ladle. Secured to the outer ends of the rod 12 are a pair of counterweighted arms 14, which in their alternate positions, hold the stopper arm 11 in open or closed positions.

When in operation, the charger is placed on the floor in front of the furnace chamber 15, as seen in Fig. 1, the spout 3 extending through the furnace opening 16. To prevent the molten metal from flowing into the furnace while it is being poured into the ladle 1, the stopper 9 may be held in orifice-closing position; or, what is more desirable, the orifice may be closed by a plug of wood or some refractory material, for example a "crucible" stopper (*i. e.* a stopper made of black lead). After the slag gathers on the top of the molten metal placed in the ladle, the orifice may be opened permitting the metal to flow into the furnace until the slag is seen, at which time the stopper 4 is brought to closed position. The slag may then be dumped from the ladle and the charger moved, by means of a crane, to the next furnace to be charged, the operation being there repeated.

I claim as my invention:

1. A movable charger for putting molten metal into furnaces, comprising a ladle, a support secured to the bottom thereof, a spout secured to the side of and extending laterally from the ladle, an orifice through the side wall of the ladle leading to the spout, and means secured to the outside of the ladle for closing said orifice to control the flow of metal therethrough.

2. A movable charger for putting molten metal into furnaces, comprising a ladle, a support secured to the bottom thereof, a spout secured to the side of and extending laterally from the ladle, an orifice through the side wall of the ladle leading to the spout, and a counterweighted arm pivoted to the outside of the ladle and provided with a stopper adapted in one position of said arm to close said orifice.

In testimony whereof I have hereunto set my hand.

DANIEL BRENNAN.

Witnesses:
BAYARD H. CHRISTY,
FRANCIS J. TOMASSON.